United States Patent [19]

Aranguren

[11] 4,027,247

[45] May 31, 1977

[54] RECEIVER ESPECIALLY FOR USE AS A DIVERSITY COMBINING RECEIVER WITH CHANNEL SELECTION CAPABILITY

[75] Inventor: William Louis Aranguren, Sayreville, N.J.

[73] Assignee: Bell Telephone Laboratories, Incorporated, Murray Hill, N.J.

[22] Filed: Nov. 11, 1975

[21] Appl. No.: 631,193

[52] U.S. Cl. .............................. 325/305; 325/320; 325/369
[51] Int. Cl.² ...................... H04L 27/14; H04B 7/08
[58] Field of Search .......... 178/66 R, 88; 325/303, 325/305, 320, 367, 368, 369

[56] References Cited

UNITED STATES PATENTS

| | | | |
|---|---|---|---|
| 2,426,187 | 8/1947 | Earp | 325/321 |
| 3,175,216 | 3/1965 | Enloe | 343/100 SA |
| 3,471,788 | 10/1969 | Bickford et al. | 325/369 |
| 3,743,941 | 7/1973 | Gans et al. | 325/305 |
| 3,859,601 | 1/1975 | Curtis | 325/367 |
| 3,911,364 | 10/1975 | Langseth et al. | 325/301 |

OTHER PUBLICATIONS

MIT Lincoln Lab. Tech. Report No. 135: Nov. 23, 1956 "Topics in the Design of Antennas for Scattering".

Primary Examiner—Benedict V. Safourek
Attorney, Agent, or Firm—Erwin W. Pfeifle

[57] ABSTRACT

A receiver especially for use as a diversity combining receiver is adapted to recover a single signal from among a plurality of cochannel signals transmitted from a plurality of sources. When recovering signals from a plurality of sources, the various sources transmit signals having PSK modulation and having, in addition, pilot tag modulation uniquely associated with each source. The output from each of the diversity branches is combined and the combined output is mixed with the output signal generated by a free-running oscillator to produce a loop signal uniquely identified by one selected tag. The processing is arranged so that when this loop signal is mixed with each branch input, the resulting sideband product of the loop signal and the one received signal having the selected tag contains a distinctive cophasing phase angle but is stripped of its PSK information and tagging modulation. However, the resulting sideband product of the loop signal and any unselected received signal contains some unremoved modulation or tagging and it is, therefore, distinguishable. Only the one modulation-free product derived from the received signal having the selected tag, is mixed with the total branch input and thus only the transmission having the selected tag contributes to the cophased combined output. The present arrangement provides a precise loop signal, and the loop will remain locked despite slight variations of either one or both of the input signal frequency or the injection frequency generated by the free-running local oscillator.

8 Claims, 3 Drawing Figures

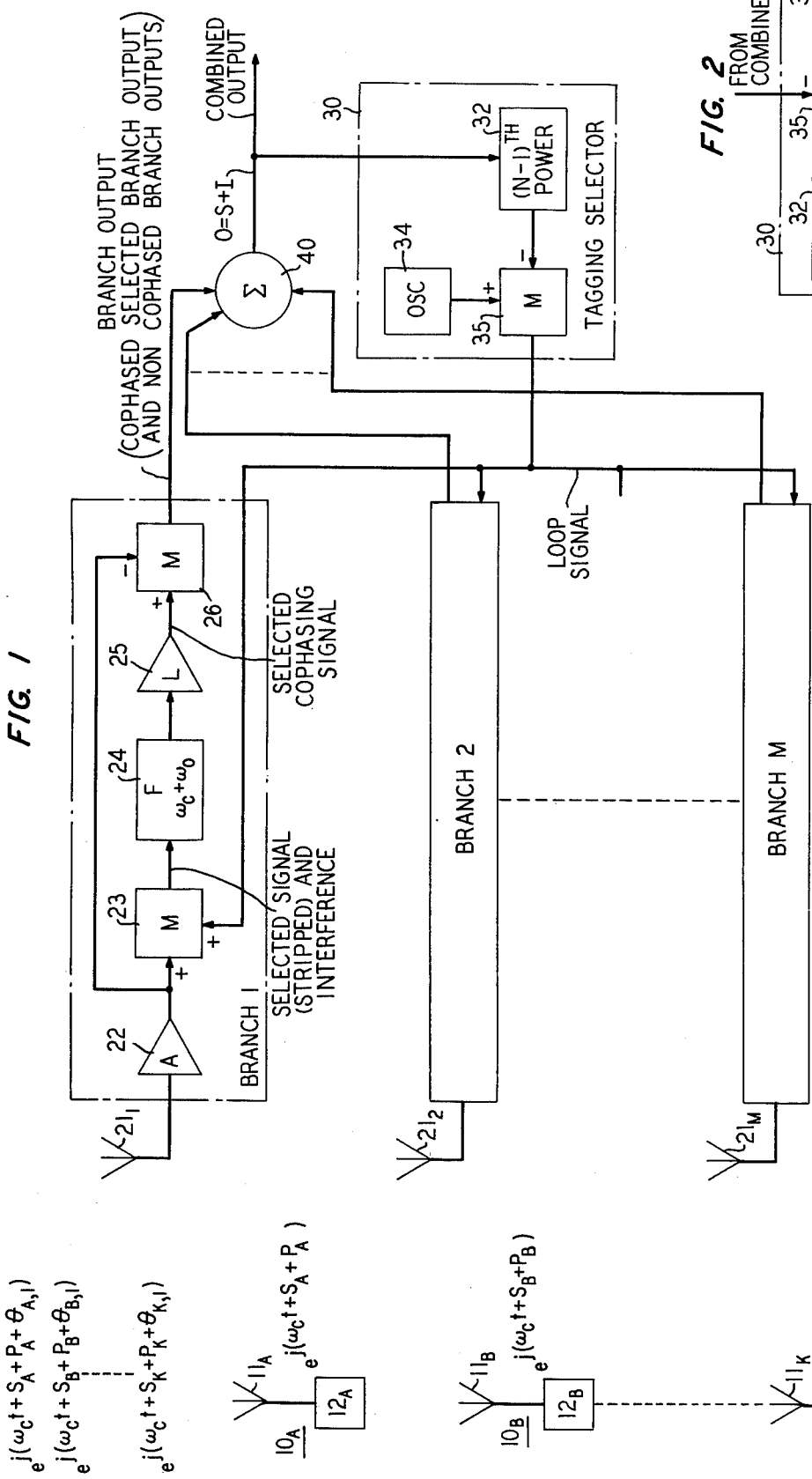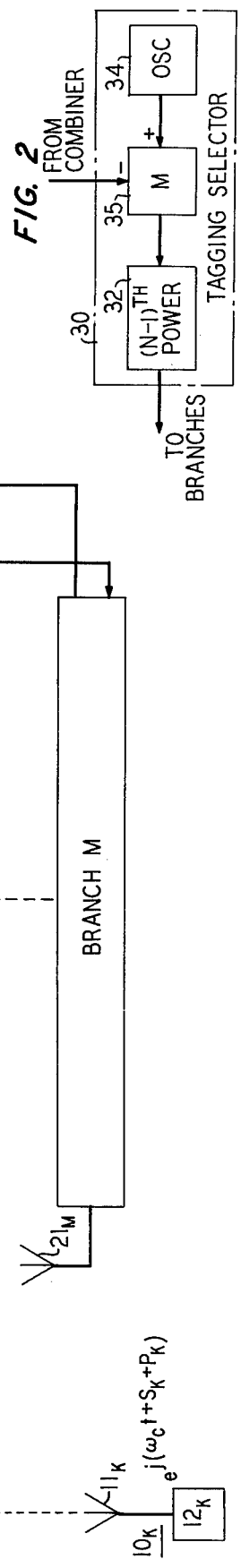

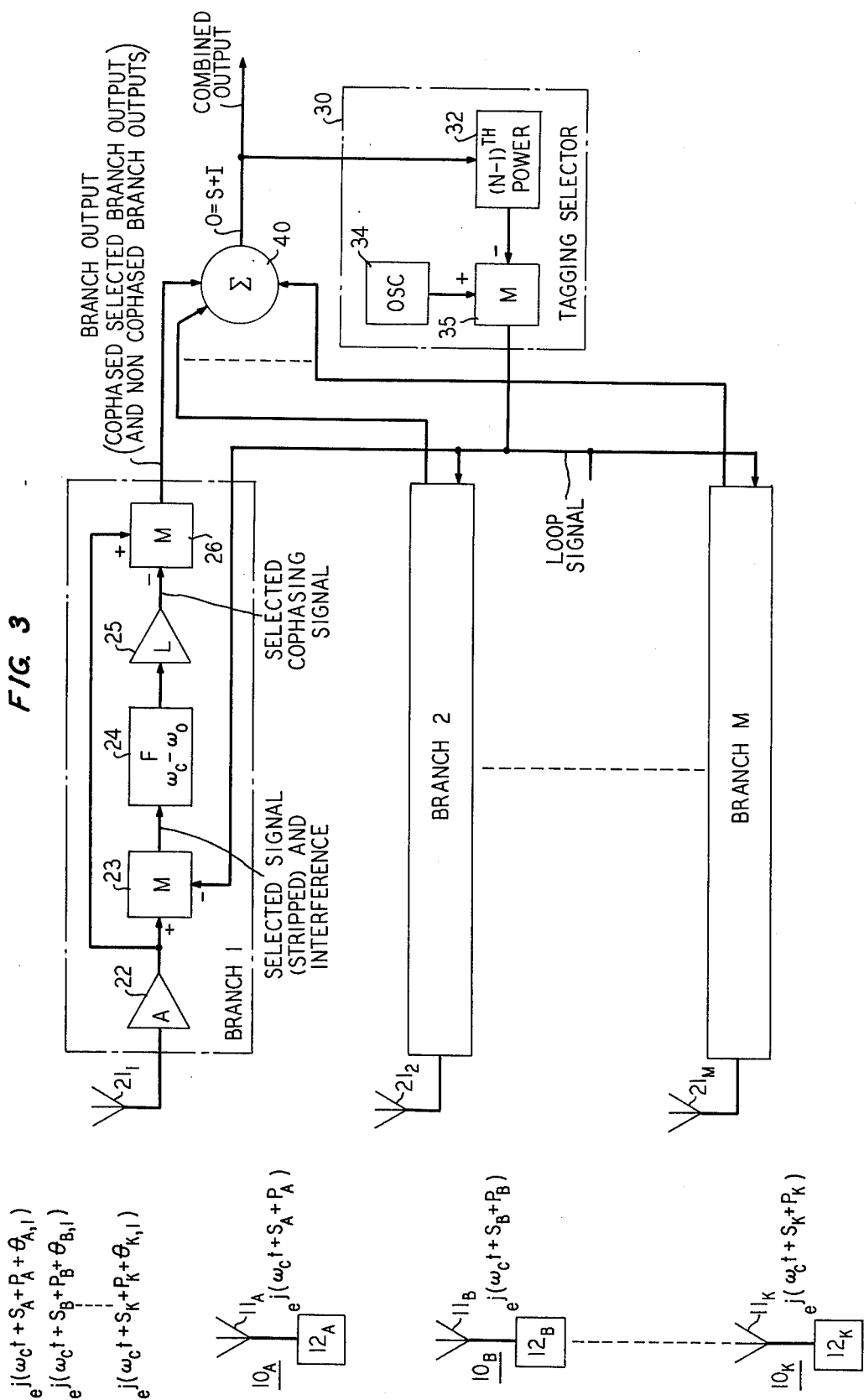

RECEIVER ESPECIALLY FOR USE AS A DIVERSITY COMBINING RECEIVER WITH CHANNEL SELECTION CAPABILITY

BACKGROUND OF THE INVENTION

The present invention relates to a receiver and especially a diversity combining receiver with channel selection capability and, more particularly, to a diversity combining receiver adapted to cophase only those inputs originating at a single selected source, even though weaker or stronger cochannel signals form one or more different sources are present.

Phased arrays are often employed to gain the advantages associated with diversity and beam steering. When used at a receiver a phased array antenna receives a plurality of inputs, each having a distinct phase angle, and the receiver cophases this plurality of inputs to produce a combined output superior to any one of the inputs. By cophasing, the receiver effectively "steers" the receiving array toward the source of the transmission, and the cophaser may also generate phase information which can be used to direct transmission (conjugate phase retransmission) back toward the source. One cophasing arrangement known as the Granlund combiner mixes the combined output with the input of each branch to eliminate or strip the intelligence. This stripped signal is then mixed with each branch input to eliminate the distinctive phase angle associated with the branch. The Granlund combiner reported initially in "Topics in the Design of Antennas for Scatter" by John Granlund, MIT Lincoln Lab Technical Report No. 135, Nov. 23, 1956 functions with any form of modulation.

In certain systems using phased array antennas, it may be necessary to conserve carrier frequencies by reusing them at the same location. In particular, this is anticipated for satellite communications systems in which differently directed beams, occupying a common frequency band, would be received at one antenna array. However, if a phased array were illuminated by a plurality of beams at the same frequency, a conventional diversity receiver could not select among the different sources of transmission since the common frequency signals, referred to herein as cochannel signals, would not be distinguishable. In fact, a Granlund type combiner could not cophase a selected one of these cochannel signals since it would inherently lock-on the strongest of them, rather than any specifically chosen one.

In copending Patent application Ser. No. 468,416 filed by R. E. Langseth et al on May 9, 1974, now U.S. Pat. No. 3,911,364, a diversity combiner is adapted to cophase only those inputs originating at a single selected source, even though weaker or stronger cochannel signals from a different source are present. The successful selection of one cochannel signal is made possible by two factors. Transmission at each source utilizes phase-shift keying (PSK) for intelligence modulation and additionally the carrier is modulated with a pilot tag distinctive for the transmission of each individual source.

The combiner receives and combines the output from each diversity branch, and the combined output is processed to produce a loop signal uniquely identified by the one unique tag corresponding to a selected source. The processing is arranged so that when this loop signal is mixed with each branch input, the upper sideband product of the loop signal and the one selected input contains the phase information associated with the selected input received at that branch, but contains neither pilot tagging nor (due to the PSK format) intelligence modulation. However, any signal received from another source, when similarly mixed with the loop signal, will yield an upper sideband product containing some intelligence modulation or tagging information. Accordingly, narrowband filtering is used to remove products produced by such unselected sources, and the remaining product, having phase information associated with the selected input, is then used as a cophasing signal. This cophasing signal is mixed with the branch input to produce a branch output containing the selected signal cophased with the corresponding signals produced in other branches. The various branch outputs are added to produce the cophased combined output. In this manner, the combiner cophases the signal having one selected tag in the presence of signals having other distinctive tags or no tags at all.

To generate the desire loop signal, the Langseth et al processing circuitry comprises (a) a processor which prepares the combined output for filtering and removes the N-phase PSK modulation from the principal term of the input to the filter; (b) a variable bandpass filter comprising a local oscillator tuned to a frequency N times the selected tag offset and locked by means of a loop consisting of two mixers, a narrow bandpass filter and a limiting amplifier to generate the desired passband and thereby the desired injection signal; and (c) a mixer for combining the injection signal with the combiner output signal mathematically raised to the (N-1) power, as generated by the processor, to produce the desired loop signal.

Although the Langseth et al arrangement represents a considerable advance in the diversity combining receiver art, it is desirable to provide a diversity combining receiver which will function as well, or better, than the Langseth et al arrangement while providing considerably simplified processing circuitry for generating the desired loop signal.

BRIEF SUMMARY OF THE INVENTION

The present invention relates to a receiver and especially a diversity combining receiver with channel selection capability and, more particularly, to a diversity combining receiver adapted to cophase only those inputs originating at a single selected source, even though weaker or stronger cochannel signals from one or more different sources are present.

The present invention further relates to a diversity combining receiver where the combiner receives the output from each diversity branch of the receiver and the combined output signal is mixed with the desired injection frequency generated by a free-running local oscillator to produce a loop signal uniquely identified by the one unique tag corresponding to a selected source. This loop signal is mixed with each branch input to produce a resultant sideband product containing the phase information associated with the selected input received at that branch, but contains neither pilot tagging nor intelligence modulation. A narrowband filtering means removes from the resultant sideband signal products produced by unselected sources, and the remaining product, having phase information associated with the selected input, is then used as a cophasing signal. This cophasing signal is mixed with the branch input signal to produce a branch output which is combined with all other branch outputs to produce a cophased combined output.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 1 is a block diagram of a transmission system including a plurality of sources and a receiver containing a selective cophasing combiner in accordance with the present invention;

FIG. 2 is a block diagram of an alternate arrangement of the tagging selector of FIG. 1;

FIG. 3 is a block diagram of an alternate arrangement of the transmission system shown in FIG. 1.

DETAILED DESCRIPTION

The present diversity combining receiver, as shown in FIG. 1, effectively provides an improved and novel tagging selector arrangement for the receiver disclosed in copending patent application Ser. No. 368,416 filed by R. E. Langseth et al on May 9, 1974, now U.S. Pat. No. 3,911,364. Therefore, for completeness, the description which follows in regard to the branch circuitry and combiner of FIG. 1 will closely correspond to the description presented therefor in the Langseth et al application.

In FIG. 1, a plurality of remotely located sources $10_A$, $10_B$, ..., $10_K$, each consisting of an antenna 11 and transmitter 12, transmit individualized signals which are all received by an antenna array $21_1$, $21_2$, ..., $21_M$ of receiver 20. The output of each source 10 may be characterized by (a) its carrier frequency $\omega_c$, which is common to all transmissions, (b) its information modulation $S_K$, and (c) its pilot modulation $P_K$. The information modulation and pilot modulation are distinct for each transmitter, and the subscript K corresponds to the particular source $10_A$, $10_B$, ..., $10_K$. By conventional notation the transmitted output from the $K^{th}$ transmitting station ($10_K$) can be designated $$e^{j(\omega_c t + S_K + R_K)} \quad (1)$$

where $K = A, B, \ldots, K$.

The individual signals radiated from antennas $11_A$ to $11K$ will arrive collectively at the antenna array of receiver 20. Each antenna of the array, such as antenna $21_1$, of branch 1, which receive all of the transmissions. The signal from each source 10 will have a common carrier frequency $\omega_c$, but will contain different information modulation $S_K$ and different pilot modulation (or tagging) $P_K$. The pilot modulation $P_K$, which serves as a tag uniquely identifying an originating source, such as, for example, source $10_A$, can comprise many forms such as, for example, PSK code modulation found generally in military applications, pseudorandom phase shift modulation, or simply a linear phase shift (frequency offset). This latter form of pilot modulation will be assumed for the following discussion of the present invention. In addition, each transmission will arrive at each individual antenna of the array from a different direction and will, therefore, have a different relative phase angle $\theta_{K,M}$, where $M = 1, 2, \ldots, M$, corresponding to the branch associated with the specific receiving antenna. The designation $\theta_{A,2}$ indicates, for example, the phase angle associated with transmission from source $10_A$ as received at receiving antenna $21_a$ of branch 2.

In general, the reception at antenna $21_M$ (corresponding to the $M^{th}$ branch of receiver 20) will be $$\sum_{K=A}^{K} e^{j(\omega_c t + S_K + P_K + \theta_{K,M})}, M = 1, 2, \ldots, M. \quad (2)$$

Since the branch 1 through M is identical in structure and function, only representative branch 1 will be described and its total branch input consisting of the plurality of received signals ($K = A, B, \ldots, K$) for that branch (that is, where $M = 1$) is indicated at antenna $21_1$.

As will be discussed in more detail hereinafter, the output of each branch will contain the cophased selected signal. The cophased output is applied to combiner 40 in which it is algebraically added to the cophased outputs of all other branches to produce the combined cophased selected output. The branch outputs also contain cochannel signals which contribute to the combined output, but they are, of course, not cophased. The entire combined output is monitored by tagging selector 30 which produces a loop signal uniquely identifying one selected tag. This loop signal, which contains a component derived from the information modulation of the selected transmission and a component derived from the corresponding pilot (tagging) modulation of the selected transmission, is applied to each branch where it is mixed with the total branch input. The tagging selector 30 produces the loop signal which is preconditioned so that this mixing, such as in mixer 23 of branch 1, in FIG. 1, produces one term of the upper sideband product having neither pilot tagging nor information modulation, but containing the phase angle associated with the selected reception as received at the one particular branch antenna. In addition to this modulation-stripped version of the selected signal, other terms of the upper sideband product derived from other parts of the total branch input, will be produced. However, such of these terms contains either tagging modulation, information modulation or both and they are removed by filter 24. The modulation-stripped selected signal is mixed in mixer 26 with the total branch input to form a lower sideband product, but only the reception from the selected source will have its phase angle $\theta$ cancelled by this process and thus only this selected signal will contribute to the cophased branch output. Of course, other products of mixer 26 exist, but they are noncophased.

To fully understand the operation of the receiver 20 and the tagging selector 30, in particular, an illustrative example will be discussed in which source $10_A$ ($K = A$) is the selected source. Of course, this is merely an arbitrarily chosen example and any of the sources could be selected, but where $10_A$ is the selected source, tagging selector 30 is adjusted to generate a loop signal uniquely identified by the pilot modulation $P_A$. Then the reception on branch 1 having the pilot tag $P_A$ is cophased in branch 1 by cancellation of the corresponding phase angle $\theta_{A,1}$.

The information modulation $S_A$ is applied at transmitter $12_A$ by phase shift keying along with the frequency offset form of pilot modulation $P_A$.

From Expression (2), the total branch input for branch 1 is:

$$\sum_{K=A}^{K} e^{j(K\omega_c t + s_K + P_K + \theta_{K,1})}. \tag{3}$$

It may also be expressed as the combinations of the selected signal and the interference; the branch 1 selected signal being $$e^{j(\omega_c t + S_A + P_A + \theta_{A,1})} \tag{4}$$

and the branch 1 interference being $$\sum_{K=B}^{K} e^{j(K\omega_c t + s_K + P_K + \theta_{K,1})}. \tag{5}$$

For purposes of discussion it will first be assumed that receiver 20 has previously locked onto and cophased with the signal from selected source $10_A$. Thus, the M selected branch outputs are combined coherently in combiner 40 to produce the combined selected cophased designated S, where:

$$S = Me^{j(\omega_o t - S_A - P_A)} \tag{6}$$

and the interference from M branches combined incoherently in combiner 40 to form the combined interference designated I, where:

$$I = \sum_{K=B}^{K} E_{KA} \, e^{j(K\omega_o t - S_K - P_K)} \tag{7}$$

where $\omega_o$ is the output frequency not equal to $\omega_c$, and where $E_{KA}$ represents the complex amplitude of the reception from the $K^{th}$ source when the receiver is cophased to another source $10_A$. For completeness, it is noted that $$E_{KA} = \sum_{M=1}^{M} e^{-j(K\theta_{KM} - \theta_{AM})}. \tag{8}$$

The interference is noncophased and contains random relative phase angles as part of $E_{KA}$, although no relative phase angle $\theta$ appears in the selected signal S.

The combined output, designated O, is the sum of S (Equation 6) and I (Equation 7):

$$O = S + I. \tag{9}$$

This output O is monitored and applied to tagging selector 30.

Tagging selector 30, in the arrangement of FIG. 1, generates the loop signal containing the unique tag $P_A$ associated with the selected source by, first, transmitting the monitored output O through a power device 32. Power device 32 mathematically takes the $(N-1)^{th}$ power of the monitored output O, where N equals the number of phases in the PSK modulation, to generate, as its output, a signal equal to $$(S + I)^{N-1} = \left[ Me^{j(\omega_o t - S_A - P_A)} \right.$$

$$\left. + \sum_{K=B}^{K} E_{KA} \, e^{j(K\omega_o t - S_K - P_K)} \right]^{N-1}$$

$$= M^{N-1} e^{j(N-1)(\omega_o t - S_A - P_A)}$$

$$+ \sum_{K=B}^{K} E_{KA} N - 1 \, e^{j(KN-1)(\omega_o t - S_K - P_K)}$$

$$+ \text{crossterms}. \tag{10}$$

The first term of Equation (10) is the "principal signal term"; it contains only the selected signal raised to a power. The second term of Equation (10) is the "principal interference term"; it is the summation of the individual interference terms, each raised to a power. The crossterms are the products of the signal term and the interference terms or the products of different interference terms.

Power device 32 can be formed by an appropriate combination of mixers. For two-phase PSK the device reduces to a direct connection since $N-1 = 1$. For four-phase PSK it is a cubic law device (using, for example, two mixers).

A free-running local oscillator 34 is tuned to produce an output signal equal to $$e^{jN(\omega_o t - P_A)} \tag{11}$$

which relates to the one desired cw signal. It is, of course, apparent that instead of selecting source $10_A$, another source could be selected simply by retuning oscillator 34 to generate an output signal having the frequency $N(\omega_o - P_K)$.

Mixer 35 combines the output from power device 32 (Equation 10) with the output from local oscillator 34 (Equation 11) to form a lower sideband product thereof. This product is the loop signal, which is a mathematically frequency shifted and inverted form of the $(N-1)^{th}$ power of the combined output O. The loop signal may be represented as $$M^{N-1} e^{j[\omega_o t + (N-1)S_A - P_A]}$$

$$+ \sum_{K=B}^{K} E_{KA}^* N - 1 \, e^{j[\omega_o t + (N-1)S_K - NP_A + (N-1)P_K]}$$

$$+ \text{crossterms} \tag{12}$$

where $E_{KA}^*$ is the complex conjugate of $E_{KA}$. The loop signal uniquely identifies the one selected source by the phase $-P_A$ in its principal signal term. The principal interference term is a summation of signals, each identified by a distinct tagging modulation $P_K$. The remaining terms are wideband crossterms. The function of this loop signal is to provide a preconditioned feedback signal which may be used in each branch to selectively cophase the signal from the selected source $10_A$.

The total branch input received by the antenna $21_1$ is set forth in Expressions (4) and (5). This input is amplified by amplifier 22 and then divided into two parts. One part is applied to mixer 23 where it is combined with the loop signal from tagging selector 30 which, as discussed previously, has been adjusted to select the specific tag, assumed here to be $P_A$. Ignoring the gain of amplifier 22, the upper sideband output of mixer 23 is $$M^{N-1} e^{j[(\omega_c + \omega_o)t + \theta_{A,1}]}$$

$$+ \sum_{K=B}^{K} E_{KA}^* N - 1 \, e^{j[(\omega_c + \omega_o)t + NP_K - NP_A + \theta_{K,1}]}$$

$$+ \text{crossterms}. \tag{13}$$

The first term is the principal signal term. The second term is the principal interference term and the crossterms are the products of the signal term and interference terms or the products of different interference terms. The principal signal term is a cw signal centered at $\omega_c + \omega_c$ and as can be seen it is modulation-free, since the mixing strips both the signal and tagging modulation. The tagging modulation is cancelled by the $-P_A$ phase in the loop signal and due to the PSK modulation format, the signal modulation in the upper sideband product will be reduced to unity. In actuality the first term of Equation (13) contains the term $NS_A$ and the second term contains the term $NS_K$. However, the signal modulation in the principal signal (or first) term and the principal interference (or second) term of Equation (13) has actually been eliminated by virtue of the PSK format since $$e^{-KNS_K} = K = A, B, \ldots, K \tag{14}$$

for N-phase PSK, where $$S_K = 2L\pi/N, L = 0, 1, \ldots, N-1. \tag{15}$$

The principal interference term is a summation of cw signals (the PSK modulation being reduced to unity), each having the appropriate cophasing information but each being frequency offset from $\omega_c = \omega_0$ by a distinctive amount due to tagging. The crossterms are signals containing wideband modulation.

The output of mixer 23 is applied to fixed narrow-band filter 24 which is centered at $\omega_c = \omega_0$. This passes only the principal signal term since all other terms are either wideband or cw signals having residual tagging modulation which places them outside the passband of filter 24.

Therefore, the output of filter 24 (input to limiter 25) is substantially the principal signal term of Equation (13) having a cw signal centered at $(\omega_c = \omega_0)$ and having cophasing information $(\theta_{A,1})$. After passing through limiter 25, which conveniently produces a unity amplitude, the limited signal is applied to mixer 26 where it serves as a cophasing signal. In mixer 26 the limited signal is combined with the other part of the total branch input from amplifier 22 to yield the lower sideband product which contains the cophased selected branch output and numerous noncophased outputs. The branch outputs from mixer 26 is $$e^{j(\omega_0 t - s_A - P_a)} + \sum_{K=B}^{K} e^{j[\omega_0 t - s_K - P_K + \theta_{A,1} - \theta_{K,1}]} \tag{16}$$

where the first term is the selected cophased output of branch 1 and the second term is the summation of the noncophased interference signals of branch 1. This cophased branch output is combined with similar cophased branch outputs from the other branches in linear combiner 40. The noncophased outputs derived from other sources are also combined, along with the cophased branch outputs, in combiner 40 to produce the combined output, $0 = S + I$, as was assumed. See Equations (6), (7), (8) and (9).

In addition, the presence of the noncophased signals do not adversely affect the tagging selection process. Of course, if another source were selected, the local oscillator 34 would be appropriately retuned to the frequency $N(\omega_0 - P_K)$. The selection and combining processes would then operate as previously described to cophase only the received signals from the newly selected source.

In certain transmission systems interference could be expected from sources outside the system. Since these sources would not provide the selected tagging, the combiner will not cophase them unless the received signals accidentally have the same effective format as the selected signal.

It was first assumed the combiner had previously cophased from source $10_A$. Of course, if the receiver were previously off, the output of combiner 40 would contain both S and I when initially turned on, but since cophasing has not previously occurred, the relative strengths of S and I are arbitrary and the output of filter 24 is randomly phased. Nevertheless, the selection process taking place in selector 30 will still tend to produce the selected cw signal, since oscillator 34 will still be generating the desired injection frequency to mixer 35. Similarly, only the component of the loop signal from the desired source contributes to a cw signal within the pass-band of filter 24 while undesired signals, which do produce cw signals (even if stronger than the desired one), would not pass filter 24. Accordingly, filter 24 effectively attenuates all nonselected signals and, therefore, increases the contribution of the desired signal in its output. Over a period of time, operation of the overall loop would pull the output of filter 24 to the phase required to cophase only the desired signal. Thus, the array will lock up to any selected source in accordance with the selected tag and will track the selected source unless the tag selection is changed.

In the Langseth et al tagging selector (not shown), the monitored output O is mathematically raised to the $N^{th}$ power $(S + I)^N$ to provide a signal where the principal signal term is a cw signal centered at the desired injection frequency and the principal interference term comprises a summation of the other cw signals, each other cw signal being both centered at $N(\omega_0 - P_K)$ and frequency offset from each of the other cw signals and the principal signal term. The signal $(S + I)^N$ is then operated on in a narrow variable bandpass filter, having a local oscillator tuned to N times the selected tag offset, to obtain the desired injection frequency $N(\omega_0 - P_A)$. Since the desired injection freqency is derived directly from the input and combined output signals, it is automatically phase-locked thereto, which is important to maintain the capability of retrieving the information from the PSK modulated signal.

The use of the present free-running local oscillator 34 to produce the desired injection signal would appear to present problems for maintaining a proper phase relationship between the injection signal and the input or output signals. However, as will be shown hereinbelow, the loop will remain locked as long as $\omega_0 + \omega_i$ remains within the passband of branch filter 24. The discussion to follow will be limited to one branch for simplicity and it will be assumed that all other branches would perform similarly even though large differential time delays between branch filters could pose difficulties. Frequency offsets will not be included explicitly but will be assumed to be incorporated within the input $(\omega_i)$, output $(\omega_o)$, and injection $(\omega_a)$ frequencies.

The combiner output frequency $(\omega_o)$ and phase $(\Psi)$ will be $$e^{j(\omega_o t + \Psi)} \tag{17}$$

where $\omega_o$ is to be determined. Modeling filters as time delays, $t_1$ will be assumed to represent the time delay through branch filter 24, and $t_2$ will be assumed to represent the time delay through mixer 26 (effectively a filter to select the lower sideband product), combiner 40 and power device 32. Therefore, the input to mixer 32 will be assumed to be $$e^{j[\omega_o(t-t_2)+\Psi]}. \quad (18)$$

When this signal, of Expression (18), is mixed with the channel selection frequency ($\omega_a$) and its phase ($\phi$), represented by the Expression $$e^{j(\omega_a t + \phi)}, \quad (19)$$

the resultant output of mixer 35 can be designated as $$e^{j[\omega_a t + \phi - \omega_o(t-t_2) - \Psi]}. \quad (20)$$

In mixer 23 the signal of Expression (20) is mixed with the input signal ($\omega_i$) and its phase ($\theta$) represented by the Expression $$e^{j(\omega_i t + \theta)} \quad (21)$$

and passed through filter 24 to produce a signal designated $$e^{j[\omega_a(t-t_1)+\phi - \omega_o(t-t_2-t_1) - \Psi + \omega_i(t-t_1)+\theta]}. \quad (22)$$

After mixing the signal of Expression (22) with the signal of Expression (21) in mixer 26, a signal designated $$e^{j[\omega_a t - \omega_a t_1 + \phi - \omega_o t + \omega_o(t_1+t_2) - \Psi - \omega_i t_1]} \quad (23)$$

is obtained. By equating the output of the branch (Expression 23) and the assumed output (Expression 17), taking into account any $2\eta\pi$ ambiguity, results in the equation $$\omega_o t + \Psi + 2\eta\pi = \omega_a t - \omega_a t_1 - \omega_o t + \omega_o(t_1+t_2) - \omega_i t_1 + \phi - \Psi. \quad (24)$$

Looking only at the time variant terms (only those terms including t since terms including $t_1$ or $t_2$ comprise fixed phase shifts) the identity $$\omega_a \equiv 2\omega_o \quad (25)$$

is obtained, which defines the output freqency, $\omega_o$, in terms of the injection frequency $\omega_a$. Using identity (25) to eliminate the time variant components and $\omega_a$ in Equation (24), a relationship describing the phase around the loop $$2\eta\pi = -(\omega_o + \omega_i)t_1 + \omega_o t_2 + (\phi - 2\Psi) \quad (26)$$

is obtained, which defines the phase of the output signal, $\Psi$, in terms of the phase, $\phi$, of the injection oscillator 34. To investigate the stability of the loop with respect to changes in the input ($\omega_o$) or injection ($\omega_a$) frequency, the input frequency will be incremented by an amount $\Delta\omega_i$, where $\Delta\omega_i$ is chosen sufficiently small such that $2\eta\pi$ is a constant. Keeping in mind that $\omega_o$ is fixed by the injection frequency $\omega_a$, the result from Equation (26) is $$\Delta\omega_i t = \Delta(\phi - 2\Psi). \quad (27)$$

A change in input frequency thus generates a phase shift, which is, in turn, absorbed by a differential phase relation between the channel-selection oscillator and the system output. Thus, the loop will remain locked as long as $\omega_o + \omega_i$ remains within the passband of branch filter 24. Similar results would be obtained if the input frequency were fixed and the injection frequency ($\omega_a$) were varied.

In FIG. 2, an alternate arrangement for tagging selector 30 is shown which is especially adapted for use under conditions where the required injection frequency $N(\omega_o - P_K)$ in FIG. 1 would be unduly high as, for example, where the number of phases (N) used for the PSK modulation become more numerous. There, the combined output (the combination of Expressions (6) and (7)) is combined in mixer 35 with the injection frequency $$e^{j\frac{K}{N-1}(\omega_o t - P_A)} \quad (28)$$

from local oscillator 34 to produce a lower sideband product equal to $$Me^{j\left(\frac{\omega_o t}{N-1} + S_A - \frac{P_A}{N-1}\right)}$$
$$+ \sum_{K=B}^{K} E_{KA} e^{j\left(\frac{\omega_o t}{N-1} + S_K + P_K - \frac{NP_A}{N-1}\right)}. \quad (29)$$

The output from mixer 35 is then mathematically raised to the $(N-1)^{th}$ power in power device 32 to produce the desired loop signal shown in Expression (12). From Expressions (11) and (28) it can be seen that for eight-phase PSK modulation, local oscillator 34 must generate an injection frequency of $8(\omega_o - P_A)$ in the arrangement of FIG. 1 whereas oscillator 34 in FIG. 2 need advantageously only generate an injection frequency of $8/7(\omega_o - P_A)$.

FIG. 3 shows an alternate configuration for the diversity receiver of FIG. 1 wherein the senses of mixers 23 and 26 in each of the branches has been changed. As a result, the narrowband branches now process the lower frequencies in the system, instead of the higher frequencies as found for the arrangement of FIG. 1. The ability to use the lower frequencies advantageously permits the use of limiters 25 in the branches which are easier to design and build than those necessary, in certain circumstances, for the arrangement of FIG. 1. Since the arrangement of FIG. 3 operates similar to that described hereinbefore for the arrangement of FIG. 1 it will not be repeated here. However, it should be noted that in the arrangement of FIG. 3, the output from combiner 40 will now be $$Me^{j(K\omega_o t + S_A + P_A)} + \sum_{K=B}^{K} E_{KA} e^{j(K\omega_o t + S_K + P_K)} \quad (30)$$

which then raised to the $(N-1)^{th}$ power in power device 32 and combined in mixer 35 with the injection frequency $$e^{jN(\omega_o t + P_A)} \quad (31)$$

from local oscillator 34 will provide a loop signal equal to $$M^N \cdot {}_1 e^{j[\omega_o t - (N-1)s_A + P_A]}$$
$$+ \sum_{K=B}^{K} E_{KA}{}^N \cdot {}_1 e^{j[\omega_o t - (N-1)s_K + NP_A - (N-1)P_K]}$$
$$+ \text{crossterms}. \tag{32}$$

When the loop signal is combined in mixer 23 with the input signal shown in Expressions (4) and (5), the input to filter 24 will be $$M^N \cdot {}_1 e^{j[(\omega_c - \omega_o)t + \theta_{A,1}]}$$
$$+ \sum_{K=B}^{K} E_{KA}{}^N \cdot {}_1 e^{j[(\omega_c - \omega_o)t + NS_K - NP_A + NP_K + \theta_{K,1}]} \tag{33}$$
$$+ \text{crossterms}. \tag{33}$$

The output from filter 24 will comprise the principal term of Expression (33) which is combined in mixer 26 with the input signal to produce a branch output signal equal to $$e^{j(\omega_o t + s_A + P_A)} + \sum_{K=B}^{K} e^{j(\omega_o t + s_K + P_K + \theta_{K,1} \theta_{A,1})}. \tag{34}$$

The arrangement for tagging selector 30 shown in FIG. 2 can also be substituted for the tagging selector 30 shown in FIG. 3. When such substitution is made, local oscillator 34 of FIG. 2 will be tuned to generate a frequency of $N/(N-1)(\omega_o + P_A)$.

The description presented hereinbefore for the arrangements of FIGS. 1 and 3 have primarily dealt with the reception of signals from a plurality of sources $10_A$, $10_B, \ldots, 10_K$. It is, however, also within the scope of the present invention to use the arrangements of FIGS. 1 and 3 as a general carrier recovery technique for a system which uses PSK modulation. In the general carrier recovery system, only one source, e.g., $10_A$, would be transmitting a PSK modulated signal, without pilot tag modulation, for reception by only one branch, e.g., branch 1, of receiver 20. Under such arrangement, combiner 40 could be eliminated and the output from the one branch would be directly connected to the input of tagging selector 30, and the expressions hereinbefore presented for the signals at various points around receiver 20 would now only include the principal terms less any pilot tag or phase angle.

In all cases it is to be understood that the above-described arrangements are merely illustrative of a smaller number of the many possible applications of the principles of the invention. Numerous and varied other arrangements in accordance with these principles may readily be devised by those skilled in the art without departing from the spirit and scope of the invention.

What is claimed is:

1. A receiver for receiving a signal comprising a carrier frequency with phase shift keying (PSK) information modulation transmitted from a source, the receiver comprising:
    a branch circuit;
    first means in said branch circuit capable of receiving as a branch input the transmitted signal from the source;
    means for processing an output signal including a first signal term comprising a branch output frequency and the PSK information modulation from said branch circuit to produce a loop signal identified by the branch output frequency and the PSK information modulation, said processing means comprising a free-running oscillator tuned to generate an output signal having a frequency equal to a proportionate value of said branch output frequency, and means for mixing the branch output signal with the output signal from said oscillator to produce the loop signal;
    second means in said branch circuit for mixing the loop signal with the branch input to produce desired sideband products comprising a first signal term having the desired sideband product of the input signal carrier frequency and the branch output frequency absent any PSK information modulation;
    narrowband filter means for passing only said first signal term from said second means; and
    third means in said branch circuit for mixing the output from said narrowband filter means with the branch input signal to produce the branch output signal for application to said processing means.

2. A receiver as claimed in claim 1 wherein, said proportionate value of said branch output frequency to which said oscillator is tuned is equal to N times the branch output frequency, where N is equal to the number of phases used in the PSK information modulation; and the processing means further comprises means for raising the branch output signal to the $N-1^{th}$ power before said branch output signal is combined in said mixing means with the output from said oscillator to produce the loop signal.

3. A receiver as claimed in claim 1 wherein, said proportionate value of said branch output frequency to which said oscillator is tuned is equal to $N/(N-1)$ times the branch output frequency, where N is equal to the number of phases used in the PSK information modulation; and the processing means further comprises means for raising the output from said mixing means to the $N-1^{th}$ power to produce the loop signal.

4. A receiver as claimed in claim 1 wherein the desired sideband products produced by said second means comprise either one of upper and lower sideband products.

5. A diversity receiver responsive to transmissions from a plurality of spaced transmitting sources, each source transmitting a signal comprising a common carrier frequency with PSK information and pilot tag modulation uniquely associated with that source, the receiver comprising:
    a plurality of branches comprising means for receiving as a branch input each of the PSK and pilot tag modulated transmissions;
    cophasing apparatus comprising means for combining the output of each branch to produce a combined output signal containing a cophased selected portion, said cophased selected portion comprising a signal term containing a desired combination of a combined output frequency and the PSK information and pilot tag modulation from a selected transmitting source; and
    means for processing the combined output signal to produce a loop signal uniquely identified by one selected pilot tag, the processing means comprising a free-running oscillator tuned to generate an output signal having a frequency equal to a proportionate value of the desired sideband product of said combined output frequency and the one selected pilto tag, and means for mixing the combined output signal with the output signal from said oscillator to produce said loop signal; each of said branches further comprising:

means for mixing the loop signal with the branch input to produce a combination of desired sideband products, one sideband product derived from the part of the branch input having the selected tag modulation being uniquely distinguishable from all other sideband products by the absence of both information modulation and pilot tag modulation, narrowband filter means for separating the one sideband product from all other sideband products, and means for mixing the one sideband product with the branch input to produce the branch output for application to the combining means 6. A diversity receiver as claimed in claim 5, wherein, said proportionate value of the desired sideband product of said combined output frequency and the one selected pilot tag to which said oscillator is tuned is equal to N, where N is equal to the number of phases used in the PSK information modulation; and the processing means further comprises means for raising the combined output signal to the $N-1^{th}$ power before said combined output signal is combined in said mixing means with the output from the said oscillator to produce the loop signal.

7. A diversity receiver as claimed in claim 5, wherein, said proportionate value of the desired sideband product of said combined output frequency and the one selected pilot tag to which said oscillator is tuned is equal to $N/(N-1)$, where N is equal to the number of phases used in the PSK information modulation; and the processing means further comprises means for raising the output from said mixing means to the $N-1^{th}$ power to produce the loop signal.

8. A diversity receiver as claimed in claim 5 wherein said branch means for mixing the loop signal with the branch input produces either one of desired upper and lower sideband products.

* * * * *